US007008499B1

(12) United States Patent
Wilson

(10) Patent No.: US 7,008,499 B1
(45) Date of Patent: Mar. 7, 2006

(54) METHOD OF USING AN ADVERTISING DEVICE

(75) Inventor: Douglas Wilson, Shippensburg, PA (US)

(73) Assignee: The Beistle Company, Shippensburg, PA (US)

( * ) Notice: Subject to any disclaimer, the term of this patent is extended or adjusted under 35 U.S.C. 154(b) by 384 days.

(21) Appl. No.: 10/645,119

(22) Filed: Aug. 21, 2003

(51) Int. Cl.
*B32B 31/00* (2006.01)

(52) U.S. Cl. ........................................ 156/249; 156/247

(58) Field of Classification Search .................. 40/360, 40/628; 150/901; 156/40, 123, 247, 249, 156/305; 215/13.1; 428/40.1, 41.8, 42.2, 428/192
See application file for complete search history.

(56) References Cited

U.S. PATENT DOCUMENTS

| | | | | |
|---|---|---|---|---|
| 3,517,450 | A * | 6/1970 | Greco | 40/310 |
| 4,268,567 | A * | 5/1981 | Harmony | 428/195.1 |
| 4,392,898 | A * | 7/1983 | Pithouse et al. | 156/85 |
| 5,205,473 | A | 4/1993 | Coffin, Sr. | |
| 5,595,802 | A | 1/1997 | Weder et al. | |
| 5,686,159 | A * | 11/1997 | Langan | 428/40.1 |
| 5,792,535 | A | 8/1998 | Weder | |
| 6,138,902 | A | 10/2000 | Welch | |
| 6,210,766 | B1 | 4/2001 | McLaughlin | |
| 6,277,454 | B1 | 8/2001 | Neale et al. | |
| 6,299,956 | B1 | 10/2001 | Freedman | |
| 6,383,592 | B1 * | 5/2002 | Lowry et al. | 428/40.1 |
| 6,447,863 | B1 | 9/2002 | Lewin | |
| 6,475,585 | B1 | 11/2002 | Yamanashi et al. | |
| 6,594,927 | B1 * | 7/2003 | Witkowski | 40/310 |
| 6,733,855 | B1 * | 5/2004 | Scott | 428/40.1 |
| 6,849,147 | B1 * | 2/2005 | Havard et al. | 156/256 |
| 2003/0043409 | A1 | 3/2003 | Parker et al. | |

FOREIGN PATENT DOCUMENTS

| | | | |
|---|---|---|---|
| DE | 3331016 | A1 * | 10/1984 |
| WO | WO 92/11333 | * | 12/1991 |

OTHER PUBLICATIONS http://www.custom-ad.com/, screen shot, Apr. 15, 2003, 2 pgs.
http://www.custom-ad.com/cool_graphics.htm, screen shot, Apr. 15, 2003, 2 pgs.
http://www.betterwhois.com/bwhois.cgi?domain=www.custom.ad.com&x=38&y=14, screen shot, Apr. 15, 2003, 2 pgs.
http://www.custom-ad.com/all_about.htm, screen shot, Apr. 15, 2003, 1 pg.
http://www.custom-ad.com/shapes_sizes.htm, screen shot, Apr. 15, 2003, 1 pg.

* cited by examiner

*Primary Examiner*—Chris Fiorilla
*Assistant Examiner*—Sonya Mazumdar
(74) *Attorney, Agent, or Firm*—David C. Jenkins; Eckert Seamans Cherin & Mellott, LLC

(57) ABSTRACT

An advertising device is provided having a bumper sticker assembly and an insulation assembly. The bumper sticker assembly has a first side that is semi-resistant to adhesives and a second side having an adhesive applied thereto. The insulation assembly has a flexible, planar insulation member and a panel of release material coupled thereto. Prior to use, or for storage, the advertising device is kept flat with the bumper sticker assembly releasably coupled to said release material. The advertising device may be used as a cup holder by removing a portion of the insulation assembly, thereby exposing a strip of adhesive, wrapping the advertising device around a container and adhering the strip to the bumper sticker assembly first side. Alternatively, the entire insulation assembly may be removed and the bumper sticker assembly may be used as a traditional bumper sticker.

3 Claims, 4 Drawing Sheets

METHOD OF USING AN ADVERTISING DEVICE

BACKGROUND OF THE INVENTION

1. Field of the Invention

This invention relates to an advertising device and, more specifically, to an advertising device having at least two functions including use as a beverage holder and use as an adhesive advertisement, i.e., a "bumper sticker."

2. Description of the Prior Art

One type of common advertising device is an adhesive advertisement structured to be applied to a flat surface, such as an automobile. Typically the adhesive advertisement is applied to a bumper and is commonly, and hereinafter, identified as a "bumper sticker." The bumper sticker may, of course, be applied to any surface such as, but not limited to, walls, notebook covers, luggage, displays, or other vehicles. The bumper sticker is typically a sheet having a first side with a printed indicia including pictures and/or text, and a second side having an adhesive applied thereto. Prior to coupling the bumper sticker to a surface, the adhesive is typically protected by a sheet of release paper. The disadvantage of a bumper sticker is its limited use. Due to the adhesive second side, the bumper sticker is essentially limited to a single purpose; application to a single surface.

Another type of advertising device is a cup holder having a printed message on the outer surface. The cup holder is, typically, a flat sheet having a first side with a printed indicia thereon and a second side that acts as an insulator. The sheet is wrapped into a hollow cylinder, with the second side on the interior, and the ends are coupled so that the cylindrical shape is maintained. A container, such as a cup, glass, or can may then be placed within the cylinder. The printed indicia is visible on the first, outer side and the second side helps to resist heat transfer through the side wall of the container. Such cup holders are typically either disposable or are structured to be durable and maintain the cylindrical shape. The disadvantage of the disposable cup holder is that, although inexpensive, it is limited to a single use. The disadvantage of the durable cup holder is that it is bulky and, relative to a disposable cup holder, expensive. Additionally, all types of cup holders are, essentially, limited to use a cup holder.

There is, therefore, a need for a multipurpose advertising device.

There is a further need for a bumper sticker that serves more than one use.

There is a further need for an inexpensive, re-useable cup holder.

There is a further need for a multipurpose cup holder.

SUMMARY OF THE INVENTION

These needs, and others, are met by the present invention which provides a multipurpose advertising device that functions as both a bumper sticker and a re-useable cup holder. The advertising device includes a bumper sticker assembly and an insulation assembly, each of which are generally rectangular and have a length of about ten inches and a height of about three and three-quarters inch. The bumper sticker assembly includes a sheet having a first side with a printed indicia under a transparent, adhesive semi-resistant surface and a second side having an adhesive applied thereto. The insulation assembly includes a flexible, planar insulation member that is coupled to a panel of a release material. The insulation member is divided into a tab portion and a body portion. The tab portion extends between the two longer sides of the insulation member and adjacent to an edge. When the tab portion is removed, there is an exposed strip of the adhesive.

When assembled, the insulation member release material is coupled to the bumper sticker assembly second side. In this configuration, the advertising device may be stored or shipped without the adhesive being exposed. The user may initially use the device as an insulated cup holder. To form the cup holder, the tab portion of the insulation member is removed thereby exposing a thin strip of the bumper sticker assembly adhesive second side. The advertising device is then wrapped into a hollow cylinder, with the insulation member in the interior side, and the exposed strip of adhesive second side is coupled to the bumper sticker assembly first side. In this configuration, the advertising device may be used as a conventional cup holder.

When the user no longer requires a cup holder, and because the bumper sticker assembly first side is semi-resistant to adhesive, the user may peel the adhered strip off of the bumper sticker assembly first side, thereby returning the advertising device to a generally sheet-like configuration. The strip with the exposed adhesive may be removed. In this configuration, the advertising device may again be easily transported without any exposed adhesive. Alternatively, the insulation may also be semi-resistant to adhesive allowing the user to fold the strip against the insulation, or, the user may keep the tab portion of the insulation and re-apply the tab portion to the exposed strip. If the user has not removed the strip and desires to reuse the advertising device as a cup holder, the user needs only to re-expose the adhesive side of the strip and wrap the device into the cylindrical shape again. This procedure may be repeated until the adhesive on the strip becomes too degraded to adhere to the opposite side of the bumper sticker assembly.

When the user no longer desires to use the advertising device as a cup holder and wishes to use the advertising device as a bumper sticker, the user needs only to remove the body portion of the insulation member, thereby exposing the bumper sticker assembly adhesive second side, and couple the bumper sticker assembly to a surface. Thus, the present invention allows an advertiser to gain an extended period of use of the advertising device. It is envisioned that such an advertising device could be used, for example, at a sports event as a cup holder, then further used as a bumper sticker on an automobile.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, the phrase "semi-resistant to adhesives" means a surface to which an adhesive, or a device having an adhesive surface, may be temporarily applied to, but which further allows the adhesive to be easily removed therefrom.

As used herein, the phrase "cup holder" shall mean a device structured to encircle or partially enclose containers such as, but not limited to, cups, cans, bottles, glasses, or mugs.

Figure 1:
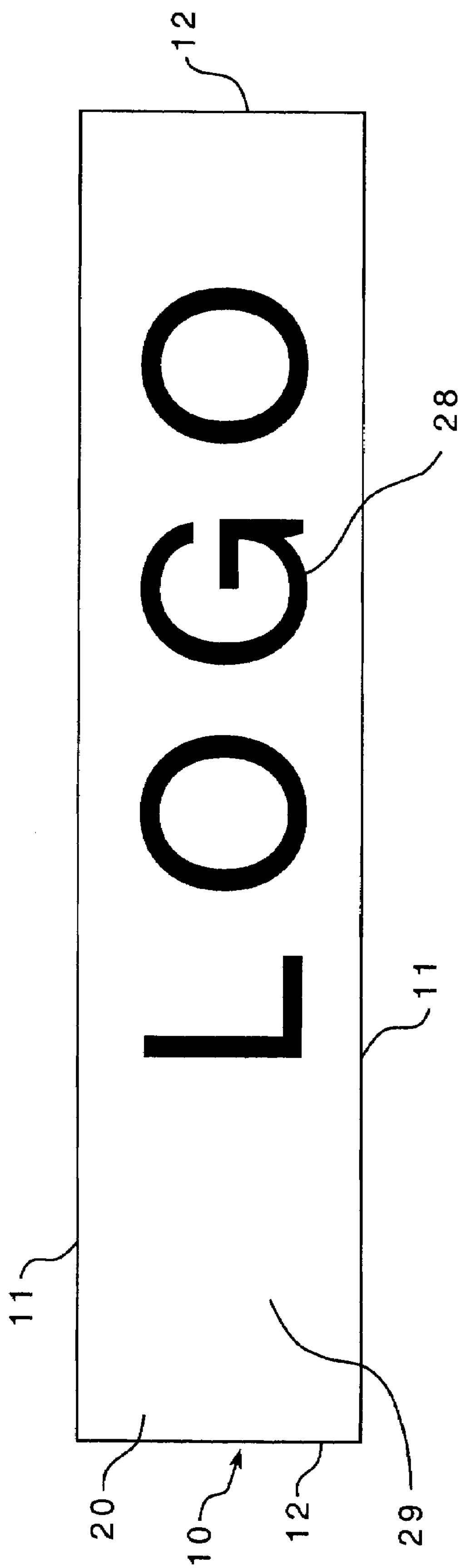
FIG. 1 is a front view of the advertising device.
Figure 2:
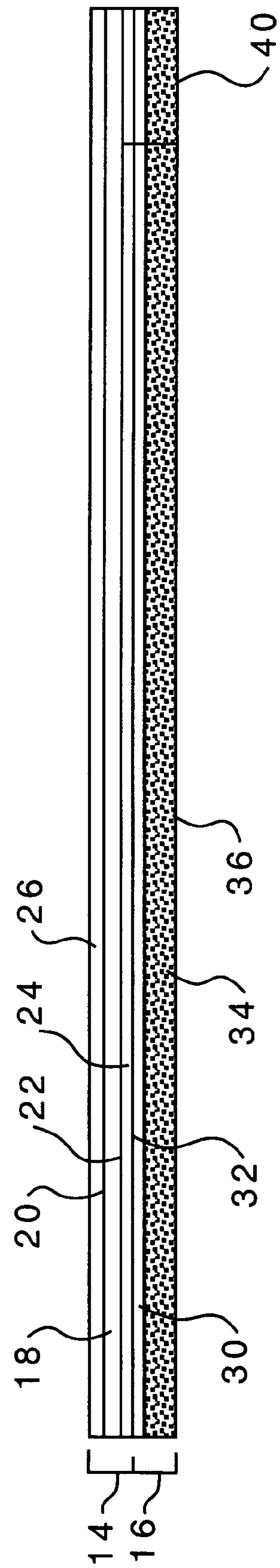
FIG. 2 is a side view of the advertising device.

As shown in FIG. 1, the present invention provides an advertising device 10 that is similar to a traditional bumper sticker. The advertising device 10 is, preferably, rectangular having two generally parallel long sides 11 and two generally parallel short sides 12. The advertising device 10 is sized to be a bumper sticker having long sides 11 with a length between about 9.5 inches and 10.5 inches, and preferably a length of 10 inches, and short sides 12 with a length between about 2.75 inches and 4.0 inches, and preferably a length of 3.75 inches.

The advertising device 10 includes a bumper sticker assembly 14 and an insulation assembly 16. The bumper sticker assembly 14 includes a sheet 18, having a first side 20 and a second side 22, an adhesive 24, and may include a transparent layer 26. The sheet first side 20 is structured to be a printable surface upon which an indicia 28, such as, but not limited to, pictures and text may be printed, painted, or otherwise applied, which hereinafter will be identified as "printed." The indicia 28 is, preferably, printed with a high gloss ink that creates a surface on the sheet first side 20 that is semi-resistant to adhesives. Alternatively, a transparent layer 26 of a material, such as, but not limited to, an ultraviolet coating that is semi-resistant to adhesives may be applied to the sheet first side 20. The indicia 28 may be offset away from the short side 12 opposite the tab portion 40, described below. This offset creates a landing 29 that is not a substantial portion of the indicia, i.e. a generally blank space. The adhesive 24 is applied to the sheet second side 22 and is, preferably, a pressure sensitive adhesive.

The insulation assembly 16 includes a panel of release material 30 having a first side 32 and a second side 34, and a flexible, planar insulation member 36. The panel first side 32 is semi-resistant to adhesives and the panel second side 34 is not resistant to adhesives. The insulation member 36 is made from a material selected from a polyethylene foam or similar material. The insulation member 36 is attached to the panel second side 34. The insulation assembly 16 is divided into at least two portions; a body portion 38 and a tab portion 40. The tab portion 40 has a length that is substantially shorter than the length of the body portion 38. The tab portion 40 has a width between about 0.25 inch and 0.75 inch, and preferably about 0.5 inch. The tab portion 40 is disposed adjacent to one of the short sides 12. As described below, the body portion 38 and the tab portion 40 may be removed separately from the bumper sticker assembly 14.

Prior to assembling the advertising device, the bumper sticker assembly first side 20 may have the indicia 28 printed thereon. When assembled, the advertising device 10 has the insulation assembly planer member first side 32 coupled to the bumper sticker assembly sheet second side 22 so that the adhesive 24 is not exposed. In this configuration, the advertising device 10 may be conveniently stored, shipped, or displayed.

Figure 3:
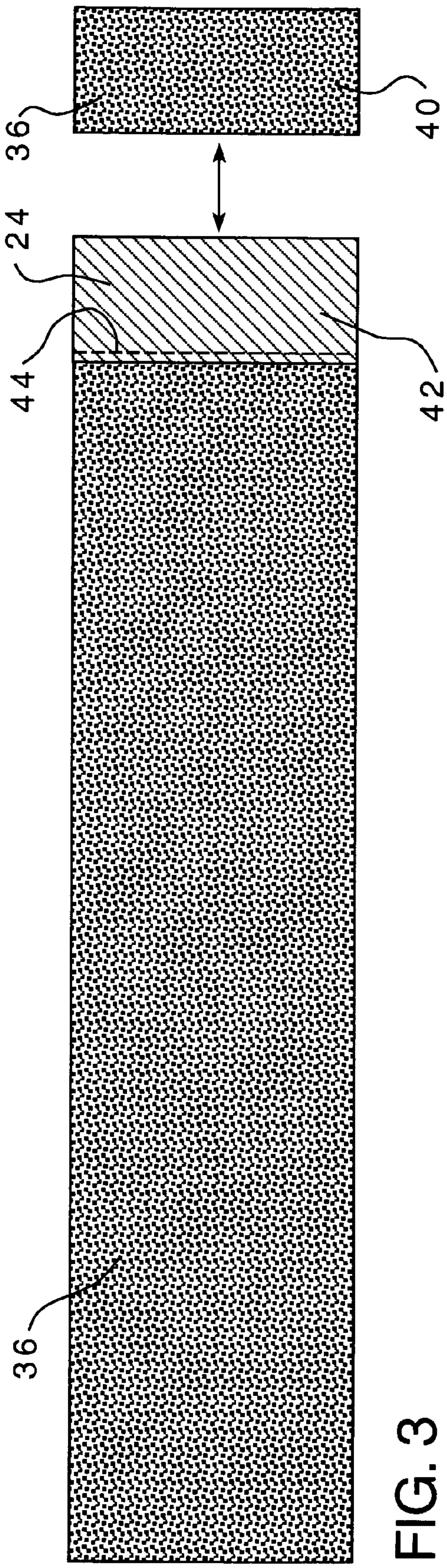
FIG. 3 is a back view of the advertising device with the tab portion separated.
Figure 4:
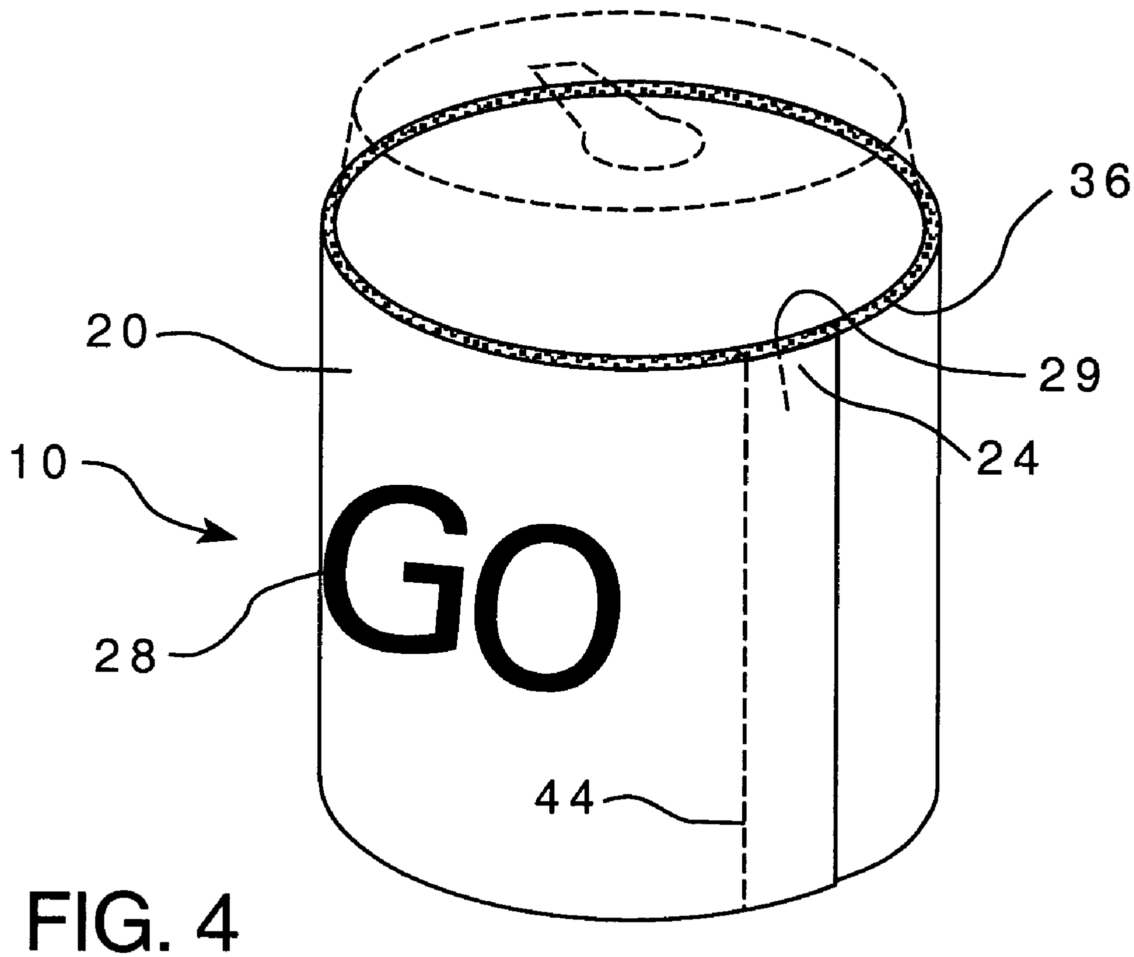
FIG. 4 is an isometric view of the advertising device in the cup holder configuration.

The advertising device 10 may be configured for use as a cup holder or bumper sticker. As shown in FIG. 3, the tab portion 40 of the insulation assembly 16 may be removed thereby exposing a strip 42 of adhesive 24. The tab portion 40 may be saved for later use or discarded. As shown in FIG. 4, to form the cup holder, the advertising device 10 is wrapped, for example, around a 12 oz. aluminum can, with the insulation assembly 16 on the inside, against the can (shown in ghost), until the exposed strip 42 is disposed above the landing 29. The exposed strip 42 is then pressed against the landing 29, thereby adhering the exposed strip 42 to the first side 20 and forming a hollow cylinder. Because the first side 20, or the transparent layer 26 coupled thereto, is semi-resistant to adhesives, the exposed strip 42 may be peeled off the landing 29 without significantly damaging or degrading the adhesive properties of the exposed strip 42. Once the user has peeled the exposed strip 42 off the landing 29, the user may wrap the advertising device 10 around another container if desired. Thus, advertising device 10 may be re-used as a cup holder for many different containers.

When the user no longer needs a cup holder, the user may replace the tab portion 40 on the exposed strip, if the tab portion 40 was kept, essentially returning the advertising device 10 to its original configuration. Alternatively, the insulation member 36 may be semi-resistant to adhesives. As such, the exposed strip may 42 be folded over until the adhesive 24 contacts the insulation member 36. As another alternative, the exposed strip 42 may be removed. This may be done if the adhesive 24 on the exposed strip 42 is too degraded for additional use, or if the tab portion 40 was discarded and/or the exposed strip of adhesive 24 is no longer needed. Perforations 44 may be provided in the bumper sticker assembly 14 to assist in removal of the exposed strip 42.

The advertising device 10 may also be used as a bumper sticker after, or instead of, being used as a cup holder. For use as a bumper sticker, the user removes any remaining portion of the insulation assembly 16 from the second side 22 of the sheet 18, thereby exposing the adhesive 24. The bumper sticker assembly 14 may then be coupled to a surface by placing the second side 22 into contact with that surface.

While specific embodiments of the invention have been described in detail, it will be appreciated by those skilled in the art that various modifications and alternatives to those details could be developed in light of the overall teachings of the disclosure. For example, the advertising device may be shaped as an arc, that is, the two long sides may be arcs, instead of a rectangle. This shape allows the advertising device to more securely fit around tapered cups. Accordingly, the particular arrangements disclosed are meant to be illustrative only and not limiting as to the scope of invention which is to be given the full breadth of the claims appended and any and all equivalents thereof.

The invention claimed is:

1. A method of using an advertising device comprising the steps of:

a) providing an advertising device comprising a bumper sticker assembly having a sheet with a first side and a second side, said first side having an indicia printed thereon, and said second side having an adhesive applied thereto, an insulation assembly having a flexible, planar insulation member and a panel of release material coupled thereto; said insulation assembly divided into a body portion and a tab portion, said tab portion disposed adjacent to one side on said insulation assembly, said sheet second side coupled to said release material, and wherein each said portion of said insulation assembly may be removed from said sheet;

b) removing said tab portion of said insulating material thereby creating an exposed strip of adhesive;

c) wrapping said advertising device around a container and securing the exposed strip of adhesive to said sheet first side;

d) detaching said exposed adhesive portion from said first side;

e) generally flattening said advertising device;

f) removing the body portion of said insulating material; and g) attaching said advertising device to a surface.

2. The method of using an advertising device of claim 1 wherein, prior to said step of generally flattening said advertising device, said method comprises the step of wrapping said advertising device around a different container and securing the exposed strip of adhesive to said sheet first side.

3. The method of using an advertising device of claim 1 wherein, prior to said step of generally flattening said advertising device, said method comprises the step of removing said exposed strip.

* * * * *